(No Model.)
T. G. BENNETT.
Machine for Trimming Cartridge Shells.
No. 236,142. Patented Jan. 4, 1881.
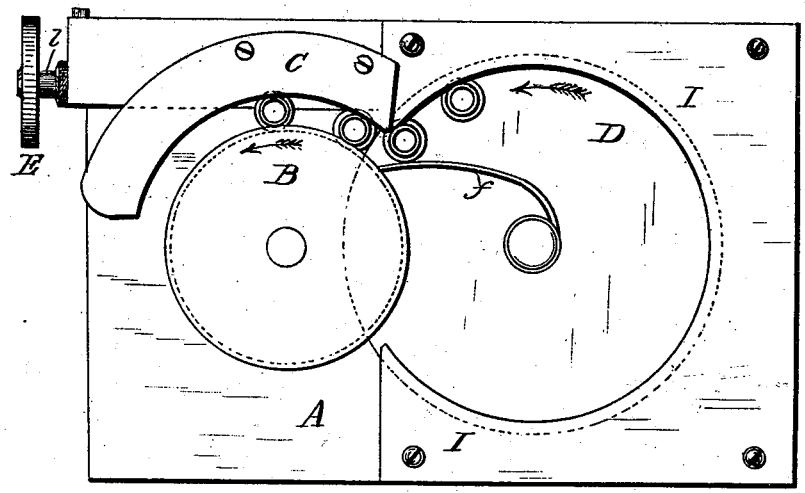
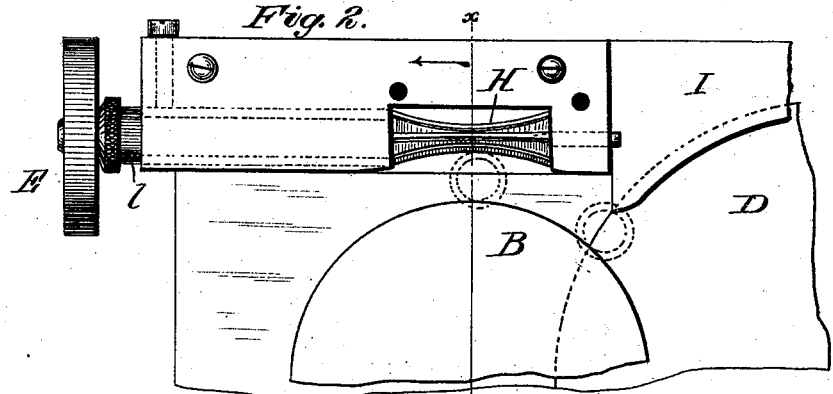
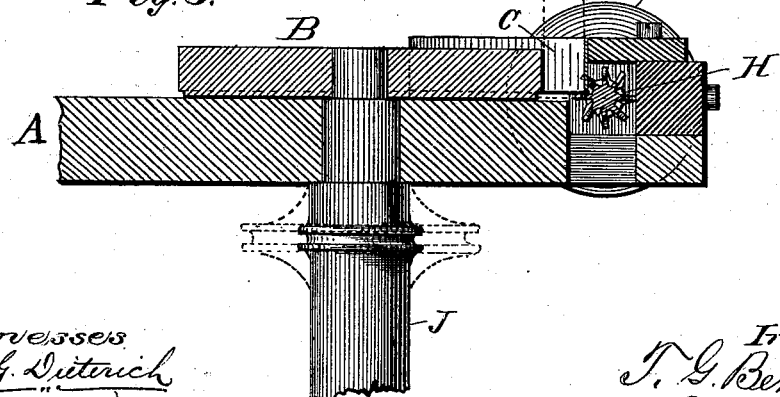
Witnesses
Fred. G. Dieterich
Walter S. Dodge
Inventor
T. G. Bennett
by Dodge & Son
Atty.

UNITED STATES PATENT OFFICE.

THOMAS G. BENNETT, OF NEW HAVEN, CONNECTICUT, ASSIGNOR TO WINCHESTER REPEATING ARMS COMPANY, OF SAME PLACE.

MACHINE FOR TRIMMING CARTRIDGE-SHELLS.

SPECIFICATION forming part of Letters Patent No. 236,142, dated January 4, 1881.

Application filed October 22, 1880. (No model.)

*To all whom it may concern:*

Be it known that I, THOMAS G. BENNETT, of New Haven, in the county of New Haven and State of Connecticut, have invented certain Improvements in Machines for Trimming Cartridge-Shells, of which the following is a specification.

My invention relates to machines for automatically trimming the heads or flanges of metallic cartridge-shells; and the invention consists in a rotating disk and guide or equivalent devices for imparting to the shells a rotary motion as they are carried along, and a rapidly-revolving cutter arranged to operate upon and trim the flanges of the shells while being thus rotated.

It further consists in combining with the above a friction-disk for automatically feeding the shells to the trimmer, all as hereinafter more fully set forth.

Figure 1 is a top-plan view of the apparatus. Fig. 2 is a similar view of a part of the apparatus, somewhat enlarged, with the guide-plate removed in order to show the position of the cutter; and Fig. 3 is a transverse vertical section on the line $x$ $x$ of Fig. 2.

It is desirable—in fact necessary—that the heads or flanges of metallic cartridge-shells shall be of a uniform diameter, or as near so as possible. In practice it is found difficult, if not impossible, to make them so by the ordinary process of heading them in dies, and it is often necessary to gage them and select those which are too large for the gage and give them a special operation of trimming, thus involving the two operations of gaging and trimming. Moreover, it is difficult by the ordinary heading process to make the heads uniformly concentric.

The object of this invention is to produce a machine which will automatically trim the heads of the shells in such a manner as to render them uniformly concentric and of uniform diameter. In order to do this I make the machine as follows:

Upon any suitable style of frame is mounted a top or table, A, on which is located a horizontally-rotating disk, B, which, as shown in Fig. 3, is secured to and driven by a vertical shaft, J, the lower edge of this disk B either having a small recess for the flange of the shell to rest in as it is fed along or the disk being elevated above the table sufficiently to permit the flange to pass under it, the former plan being shown in Fig. 3 and by dotted lines in Figs. 1 and 2.

A curved guide-plate, C, is secured concentrically around one edge of this disk B, as shown in Fig. 1, it also having a corresponding recess for the flange of the shell at its lower edge, the guide C being set at such a distance from the edge of the disk as to leave a space of the proper width to permit the shells, when standing vertically, to be rolled along between the edge of the disk and the adjoining face of the guide-plate C, as represented in Fig. 1, the shells being rotated and carried along through the passage-way by the friction of the rotating disk B.

Underneath the guide-plate C, I locate a revolving cutter, H, as shown in Figs 2 and 3, this cutter having its cutting blades or teeth so formed as to have their edges concentric with the edge of the disk B, as shown in Fig. 2, so that as the shells are rolled along past it its teeth will operate upon the projecting edge of the flange and trim it to a uniform size. This cutter H is secured upon a shaft, $l$, mounted in suitable bearings, as indicated by dotted lines in Fig. 2, in such a manner that it can be adjusted to the exact position required, and is driven by a pulley, E, at a high speed.

In order to feed the shells to the operating devices above described, I arrange a friction-dial, D, in the position shown in Fig. 1, its upper face being arranged on a level with the top A, so that the shells will pass readily from it into the space between the disk B and the guide-plate C, as indicated in Figs. 1 and 2. This feed-dial D is surrounded by a raised piece, I, which forms an exterior guide, and there is also a curved guide, *f*, arranged as shown in Fig. 1, these two guides thus serving to direct the shells, which are set loosely on the dial D, to the entrance between the friction-disk B and the guide C, by which they are rolled along past the cutter H. By these means I produce an exceedingly simple and cheap machine, which is automatic in its operation on the shells, it only being necessary to set the shells on the feed-dial D, which can be done by a girl or boy. By causing the shells to rotate on their axes as they are carried along past the rapidly-revolving cutter H, the entire circumference of their flanges will be brought around next to the cutter, which will cut away all eccentric or improperly projecting parts, thus reducing them all to a perfectly uniform diameter and rendering the heads perfectly concentric with the bodies of the shells.

Motion is given to the disks B D and the cutter H by any suitable means, the feed-disk D being made to move at greater speed than the disk B, so as to always keep the shells fed up to the entrance and keep the disk B supplied with shells.

By passing all the shells through a machine of this kind they will all be made uniform, those of the right size passing through without being trimmed, while those which are too large or eccentric will be reduced to the proper size and form, and thus a great saving of time and labor will be effected, besides insuring that no shells of improper size or form shall be turned out.

It is obvious that instead of a disk and curved guide devices may be substituted which will feed the shells along in a right line, in which case the edge of the teeth of the cutter might be made straight instead of curved. As substitutes for the disk B and guide C, I will mention a straight guide with an endless metallic belt or chain arranged to pass around pulleys and supported by a rigid guide or back placed parallel with the guide over the cutter, as it is obvious that by these means the shells could be rolled along in a straight line. The disk and curved guide are, however, preferred, as they are simpler and cheaper to make and will operate with great accuracy.

Having thus described my invention, what I claim is—

1. In combination with the rotating disk B and guide C, or equivalent devices for rotating and feeding the shells along, a revolving cutter, H, for trimming the flanges of the shells, the combination being substantially such as is herein described.

2. In combination with the rotating disk B, guide C, and cutter H, or equivalent devices, the friction-dial D, with its guides I and $f$, the whole being constructed and arranged to operate substantially as and for the purpose set forth.

THOMAS G. BENNETT.

Witnesses:
DANIEL H. VEADER,
JAMES U. KIMBALL.